United States Patent
Neustadt et al.

(10) Patent No.: US 12,517,227 B2
(45) Date of Patent: Jan. 6, 2026

(54) OPTICAL SYSTEM, LIDAR SENSOR, AND METHOD FOR PRODUCING THE OPTICAL SYSTEM

(71) Applicant: Robert Bosch GmbH, Stuttgart (DE)

(72) Inventors: Alf Neustadt, Stuttgart (DE); Markus Rohrbach, Heilbronn (DE); Ruben Wahl, Kernen im Remstal (DE); Stefan Spiessberger, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 373 days.

(21) Appl. No.: 18/005,694

(22) PCT Filed: Aug. 10, 2021

(86) PCT No.: PCT/EP2021/072226
§ 371 (c)(1),
(2) Date: Jan. 17, 2023

(87) PCT Pub. No.: WO2022/053245
PCT Pub. Date: Mar. 17, 2022

(65) Prior Publication Data
US 2023/0288539 A1    Sep. 14, 2023

(30) Foreign Application Priority Data
Sep. 14, 2020    (DE) .................. 10 2020 211 476.5

(51) Int. Cl.
*G01S 7/481*    (2006.01)
*G02B 7/02*    (2021.01)

(52) U.S. Cl.
CPC ............ *G01S 7/4814* (2013.01); *G02B 7/025* (2013.01)

(58) Field of Classification Search
CPC .... G01S 7/4814; G02B 7/025; G02B 19/0014
See application file for complete search history.

(56) References Cited

U.S. PATENT DOCUMENTS

| | | | |
|---|---|---|---|
| 2009/0283666 A1* | 11/2009 | Tagashira | G01S 17/04 250/216 |
| 2017/0017051 A1* | 1/2017 | Kaneko | G02B 6/32 |
| 2020/0400913 A1* | 12/2020 | Mochizuki | G02B 7/025 |

FOREIGN PATENT DOCUMENTS

| | | |
|---|---|---|
| DE | 102008027721 A1 | 12/2009 |
| DE | 102015208276 B4 | 10/2018 |

(Continued)

OTHER PUBLICATIONS

International Search Report for PCT/EP2021/072226, Issued Jan. 10, 2022.

*Primary Examiner* — Jia X Pan
(74) *Attorney, Agent, or Firm* — NORTON ROSE FULBRIGHT US LLP

(57) ABSTRACT

An optical system. The optical system includes: a light source, a base holder comprising first and second fastening regions, and an optical unit comprising third and fourth fastening regions. The optical unit is fastened to the base holder in a joining direction oriented transversely to the fastening regions, such that the first fastening region is glued to the third fastening region and the second fastening region is glued to the fourth fastening region. The light source is fastened in a predefined position and with a predefined orientation relative to the base holder. The third and fourth fastening regions are provided on the optical unit so as to be spaced apart from one another in the joining direction between the optical unit and the base holder. The optical unit is configured to influence a light beam emitted by the light source toward the optical unit.

7 Claims, 3 Drawing Sheets

(56) References Cited

FOREIGN PATENT DOCUMENTS

| | | |
|---|---|---|
| DE | 102018207281 A1 | 11/2019 |
| DE | 102018207297 A1 | 11/2019 |
| DE | 102019200061 A1 | 7/2020 |
| WO | 2019193706 A1 | 10/2019 |
| WO | 2020180786 A1 | 9/2020 |

* cited by examiner

OPTICAL SYSTEM, LIDAR SENSOR, AND METHOD FOR PRODUCING THE OPTICAL SYSTEM

FIELD

The present invention relates to an optical system, to a LiDAR sensor comprising an optical system of this kind, and to a method for producing the optical system.

BACKGROUND INFORMATION

Laser radiation is often formed by cylinder lenses such that adapted illumination (e.g., a laser line) can be implemented with different laser emitter geometries. Simple optics for generating a laser line can, for example, consist of a cylinder lens, which collimates a laser beam in one spatial direction (e.g., a horizontal spatial direction) and does not influence this laser beam in a spatial direction that is perpendicular thereto (e.g., a vertical spatial direction). Owing to the collimation in one spatial direction and divergence in the spatial direction that is perpendicular thereto, a laser line is formed even at small distances from the optical system. A cylinder lens can therefore be moved in the non-collimated spatial direction without influencing beam forming of the laser beam. In order to achieve the required collimation, the optics have to be positioned as precisely as possible in terms of the focal distance of the optics from the laser source. In this case, two typical adhesive-bond geometries are utilized in the related art. For an axial adhesive bond, the optics are adhered to a holder in the beam propagation axis. For a lateral adhesive bond, the optics are adhered into a cut-out in a holder on opposite sides.

German Patent Application No. DE 10 2008 027 721 A1 describes an optical system comprising an apparatus for compensating for thermal influences, the apparatus for compensating for the thermal influences interacting with a carrier arrangement. The mechanism for compensating for the thermal influence is based on a reference of coefficients of thermal expansion of the different materials involved in constructing the carrier arrangement in order to convert a temperature change into a mechanical adjusting movement.

German Patent No. DE 10 2015 208 276 B4 describes a lens module for an imaging instrument, having a lens arrangement comprising a first lens and a second lens and a holder, wherein a first adhesive is arranged between a surface of the first lens and the holder, and a second adhesive is arranged between the further surface of the first lens and the holder, such that an effect that a change in refractive indices of the first and second lenses due to a change in a temperature of the lens arrangement has on a focal distance of the lens arrangement and an effect that a deformation of the first lens due to the change in the temperature of the lens arrangement has on the focal distance of the lens arrangement cancel each other out.

SUMMARY

According to a first aspect of the present invention, an optical system is provided. According to an example embodiment of the present invention, the optical system comprises a light source, a base holder comprising a first fastening region and a second fastening region, and an optical unit comprising a third fastening region and a fourth fastening region. In principle, any light sources having any wavelength ranges are possible as the light source (e.g., for generating visible light, infrared light, or near-infrared light), but particularly possible are laser light sources such as laser diodes, which are light sources of a LiDAR sensor, for example. By way of example, the base holder is made of metal and/or plastics material and/or glass and/or a different material and is, for example, in the form of a cuboid hollow body (e.g., in the form of a housing), in the form of a transparent solid body, in the form of a frame, or in a different form. The optical unit is fastened to the base holder in a joining direction oriented transversely, in particular perpendicularly, to the fastening regions, such that the first fastening region is glued to the third fastening region and the second fastening region is glued to the fourth fastening region.

For the optical system according to an example embodiment of the present invention, it is advantageous for the order of the arrangement of the first fastening region, the third fastening region, and the interposed adhesive bond in the joining direction between the base holder and the optical unit to be identical to the order of the arrangement of the second fastening region, the fourth fastening region, and the interposed adhesive bond in the joining direction. This provides the advantage that any changes in length of the adhesive bonds (e.g., caused by aging and/or environmental influences such as fluctuations in temperature and/or humidity, etc.) in or counter to the joining direction act in the same direction at both adhesive bonds, such that, although this moves the optical unit relative to the light source in or counter to the joining direction, tensile or compressive stress on the adhesive bonds is prevented from developing. Accordingly, such changes in length of the adhesive bonds in the optical system according to the present invention do not result in the adhesive bonds potentially tearing apart, meaning that the present optical system has particularly good reliability.

The light source is fastened in a predefined position and with a predefined orientation relative to the base holder. This kind of fastening is preferably provided by the base holder and the light source being arranged on a shared main body, such as a substrate, which can be made of any materials and in particular of a circuit-board material. The light source is arranged outside and/or inside the base holder, wherein, in all cases, the base holder has a cut-out and/or light-conducting parts, such that light generated by the light source can exit toward the optical unit on the side on which the base holder is fastened to the optical unit. In this context, it should be noted that the light source can be pre-assembled so as to be integral with the base holder or can itself be configured as the base holder.

Furthermore, the third fastening region and the fourth fastening region are provided on the optical unit so as to be spaced apart from one another in the joining direction between the optical unit and the base holder. Preferably, the third and the fourth fastening region are positioned on opposite edges of the optical unit; different positions in which the respective fastening regions can be arranged are explained in greater detail below in conjunction with the description of advantageous embodiments of the present optical system.

The optical unit is configured to influence a light beam emitted by the light source toward the optical unit. To influence the light beam, the optical unit is preferably a beam-forming optical unit (e.g., a collimation lens, etc.), and alternatively or additionally is a beam-guiding optical unit (e.g., a mirror, a beam splitter, etc.) and/or a beam-filtering optical unit (e.g., a polarization filter, a gray filter, etc.).

A further advantage of the present optical system is that greater flexibility is achieved in selecting a particular adhesive for fastening the optical unit to the base holder since, owing to stresses being prevented in the region of the adhesive bonds in accordance with the present invention, adhesives having unfavorable expansion properties and/or higher levels of elasticity and/or higher levels of shrinkage can be used during curing etc., with the selection of the adhesive potentially resulting in cost benefits.

Preferred developments of the present invention are disclosed herein.

According to an advantageous embodiment of the present invention, the optical unit comprises a lens or a lens system, on which an optics holder is preferably pre-assembled, wherein the third fastening region and/or the fourth fastening region is/are provided on the optics holder. The optics holder is, for example, made of metal and/or plastics material and is connected to the lens or lens system in a materially bonded and/or form-fitting and/or force-locked manner. If a lens system is used, then the optics holder, in addition to providing the function of fastening the optical unit to the base holder, advantageously also performs a function of fastening respective lenses of the optical unit to one another. This makes it possible to arrange the individual lenses in the direction of the optical path and/or transversely to the direction of the optical path by way of the optics holder.

Particularly advantageously, according to an example embodiment of the present invention, the lens or lens system comprises a (convex, concave, or double-convex) cylinder lens, which is preferably arranged in the optical path of the optical system such that it collimates light generated by the light source in one spatial direction (e.g., in a horizontal emission direction), while the light remains substantially not influenced in a spatial direction that is perpendicular thereto. Alternatively or additionally, the lens or lens system comprises symmetrical optics, in particular a spherical lens, and/or a microlens array, in particular a cylindrical microlens array.

Preferably, according to an example embodiment of the present invention, the optical unit comprises at least one fastening bracket, which covers the base holder in the joining direction and comprises the third fastening region or the fourth fastening region. In this case, the fastening bracket is either a constituent part of the optics holder or an additional component which is fastened to the lens or lens system and/or to the optics holder. In particular, a fastening bracket of this kind has advantages in terms of making it simple to design the base holder and/or the optical system and/or it being easier to assemble the respective components.

In an advantageous embodiment of the present invention, the third fastening region and/or the fourth fastening region is/are provided in respective cut-outs in the optical unit, wherein the respective cut-outs fully penetrate the optical unit, such that a projecting part of the base holder (e.g., a bar) can be guided through the cut-out in order to be glued to the optical unit within the cut-out. This provides the advantage, inter alia, that the optical unit only has to comprise a beam-influencing element and not an additional optics holder. It is, however, explicitly also possible to combine the present embodiment of the optical unit and an additional optics holder.

Particularly advantageously, respective materials for producing the base holder and the optical unit have substantially uniform coefficients of thermal expansion. In this way, particularly low stresses are generated in the region of the adhesive bonds, since heat-related expansions of the base holder and the optical unit in or counter to the joining direction have a uniform effect and thus compensate for one another in terms of their effects on the adhesive bonds.

Particularly preferably, the optical unit brings about collimation in a predefined spatial direction, wherein the joining direction and thus the arrangement of the respective fastening regions are determined such as to minimize the influence that movement of the optical unit relative to the light source in the joining direction has on the collimation. Using the example of the use of a cylinder lens in the optical unit, the cylinder lens is accordingly fastened such that the third and fourth fastening regions are arranged to be spaced apart from one another in the direction of the axis of curvature of the cylinder lens. A change in length of the adhesive bonds thus causes the cylinder lens to move in the direction of the axis of curvature, meaning that a distance between the cylinder lens and the light source and thus an influence on the beam by the cylinder lens remain substantially not influenced.

According to a second aspect of the present invention, a LiDAR sensor is provided. According to an example embodiment of the present invention, the LiDAR sensor comprises a transmitting unit having an optical system according to the above description. By way of example, the LiDAR sensor is a point scanner or line scanner, or a flash LiDAR sensor. The LiDAR sensor is preferably a surround sensor of a means of transport, wherein the means of transport is, for example, a road vehicle (e.g., a motorcycle, a passenger car, a transporter, a truck) or a rail vehicle or an aircraft/airplane and/or a watercraft, without this limiting the LiDAR sensor to one single application on a means of transport. The features, combinations of features, and the resulting advantages correspond to those set out in connection with the first-mentioned aspect of the present invention, and therefore reference is made to this above information to avoid any repetition.

According to a third aspect of the present invention, a method for producing an optical system is provided. According to an example embodiment of the present invention, in a first step of the method according to the present invention, a light source and a base holder are used, wherein the light source is fastened in a predefined position and with a predefined orientation relative to the base holder. In a second step of the method according to the present invention, an adhesive is applied to a first fastening region of the base holder and/or a third fastening region of an optical unit and to a second fastening region of the base holder and/or a fourth fastening region of the optical unit, wherein the third fastening region and the fourth fastening region are provided on the optical unit so as to be spaced apart from one another in a joining direction between the optical unit and the base holder. The adhesive is preferably applied mechanically by an assembly device. In a third step of the method according to the present invention, the optical unit is fastened to the base holder in the joining direction, which is oriented transversely, in particular perpendicularly, to the fastening regions, such that the first fastening region is glued to the third fastening region and the second fastening region is glued to the fourth fastening region, wherein the optical unit is configured to influence a light beam emitted by the light source toward the optical unit. The optical unit is preferably likewise fastened mechanically by the assembly device, wherein the optical unit is guided toward the base holder in the joining direction and/or transversely to the joining direction during the fastening process.

Particularly advantageously, according to an example embodiment of the present invention, the step of fastening the optical unit to the base holder comprises roughly positioning and roughly orienting the optical unit relative to the light source, wherein, during this step, the fastening regions of the base holder are not yet in contact with the corresponding fastening region in the optical unit via the adhesive. This provides the particular advantage that, even at this point in time, the optical unit can be brought very close to its target position without unintentionally spreading the applied adhesive in this state, which would potentially lead to the adhesive spreading out in an undefined manner and thus to a potentially unreliable adhesive bond. In addition, positioning the optical unit close to its target position makes it possible for the arrangement of the optical unit relative to the light source to be roughly checked even in this state (e.g., by way of an optical measurement on the basis of the light from the light source and/or by approaching a predefined position). In a subsequent step, the optical unit and the base holder are brought together in the joining direction such that the respective fastening regions of the base holder come into contact with the corresponding fastening regions in the optical unit via the adhesive. In this state, the optical unit is then advantageously finely positioned and finely oriented relative to the light source with the aid of an optical measurement. Once the optical unit has been finely positioned and finely oriented, it is kept in its thus adjusted target position relative to the light source by the assembly device until the adhesive is cured in a final method step. Depending on the type of adhesive used and/or the time constraints of the above-described production method, the curing is carried out by waiting for a predefined curing time and/or by way of an activation treatment, which is, for example, a thermal treatment and/or a UV radiation treatment.

BRIEF DESCRIPTION OF THE DRAWINGS

In the following, exemplary embodiments of the present invention will be described in detail with reference to the figures.

DETAILED DESCRIPTION OF EXAMPLE EMBODIMENTS

Figure 1A:
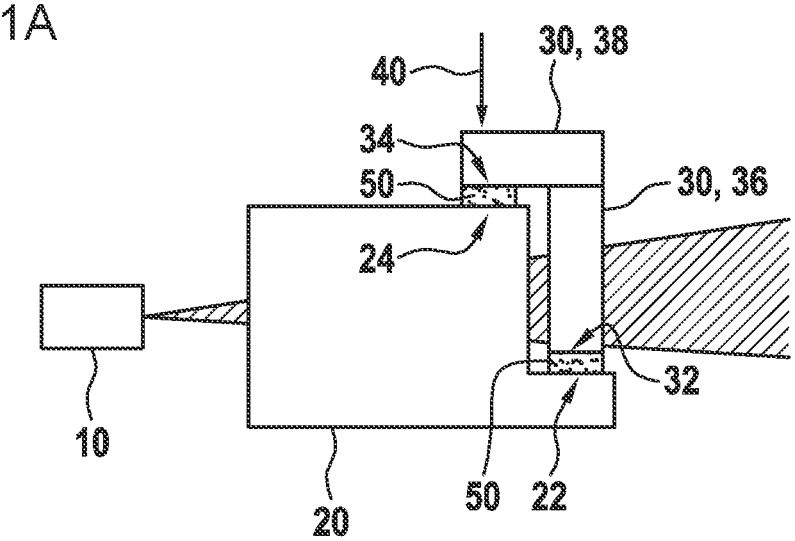
FIG. 1A is a schematic side view of an optical system according to the present invention in a first specific embodiment.

FIG. 1A is a schematic side view of an optical system according to the present invention in a first specific embodiment. The optical system comprises a base holder 20, which is made of plastics material in this case and is hollow inside, such that a light beam entering from the side can exit on an opposite side of the base holder 20 through the base holder 20 without being affected. In this case, a light beam of this kind is laser light generated by a laser diode 10, wherein the laser diode 10 is fastened in a predefined position and with a predefined orientation relative to the base holder 20. The base holder 20 also comprises a first fastening region 22 and a second fastening region 24. The optical system further comprises an optical unit 30 comprising a third fastening region 32 and a fourth fastening region 34. The optical unit 30 is composed of a cylinder lens 36 and a bracket-shaped optics holder 38, which is glued to the cylinder lens 36 perpendicularly thereto. The optical unit 30 is fastened to the base holder 20 in a joining direction 40 oriented perpendicularly to the fastening regions 22, 24, 32, 34, such that the first fastening region 22 is glued to the third fastening region 32 and the second fastening region 24 is glued to the fourth fastening region 34 by an adhesive 50.

In addition, the optical unit 30 is configured to collimate the laser light, generated by the laser diode 10, in a horizontal direction and to allow it to pass through without being influenced in a vertical direction. This means that any changes in length of the adhesives 50 do not affect the collimating function of the cylinder lens 36, or only affect it to a negligible extent.

During the production of an optical system of this kind, the optical unit 30 is preferably first brought closer to the base holder 20 by an assembly device such that an adhesive 50 applied to the first fastening region 22 and the second fastening region 24 is not quite yet in contact with the optical unit 30. In this state, the optical unit 30 is then first roughly positioned and roughly oriented relative to the laser diode 10. The optical unit 30 is then lowered in the joining direction 40 onto the adhesives 50 applied to the base holder 20, such that the fastening regions 22, 32 and the fastening regions 24, 34 are each in contact with one another via the adhesives 50. The optical unit 30 is then finely positioned and finely oriented relative to the laser diode 10 by the assembly device in the joining direction 40 and/or transversely to the joining direction 40 (i.e., in the direction of the optical path of the optical system).

Figure 1B:
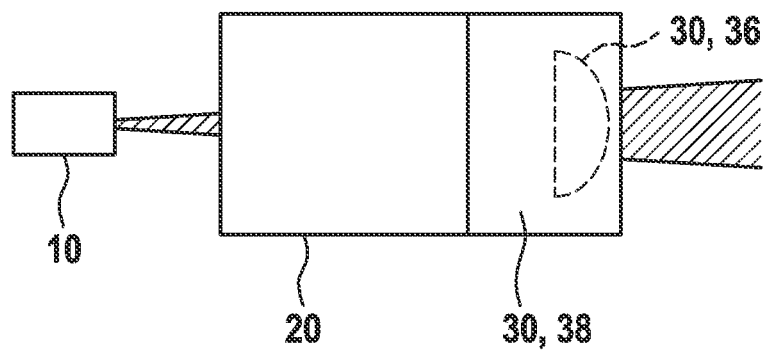
FIG. 1B is a schematic plan view of the optical system according to the present invention in the first specific embodiment.

FIG. 1B is a schematic plan view of the optical system according to the present invention in the first specific embodiment. The plan view shows that the laser light generated by the laser diode 10 is collimated in the horizontal direction by the cylinder lens 36 (which is shown by dashed lines since, in the plan view, it is covered by the optics holder 38 of the optical unit 30) after it exits the base holder 20.

Figure 2A:
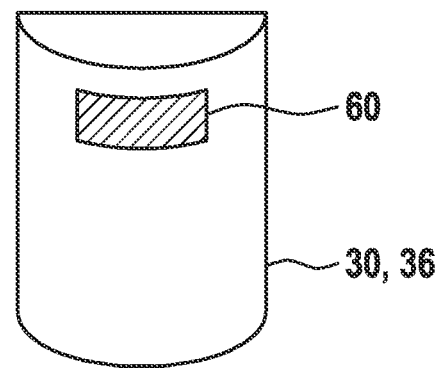
FIG. 2A is a perspective front view of a cylinder lens of an optical system according to the present invention in a second specific embodiment.

FIG. 2A is a perspective front view of a cylinder lens 36 of an optical system according to the present invention in a second specific embodiment. In this specific embodiment, the optical unit 30 only consists of the cylinder lens 36 itself and therefore does not comprise an optics holder 38. Instead, for fastening the cylinder lens 36 to the base holder 20, a cut-out 60 is provided in the cylinder lens 36, which cut-out passes through the cylinder lens 36 completely from front to back in this view.

Figure 2B:
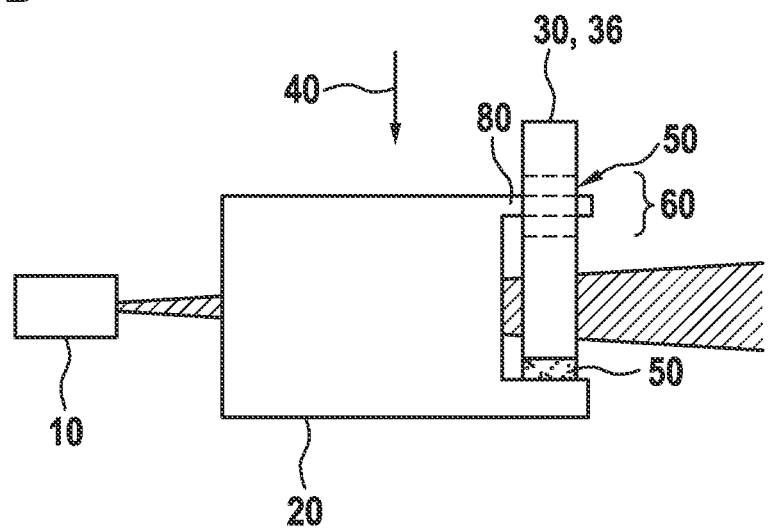
FIG. 2B is a schematic side view of the optical system in the second specific embodiment.

FIG. 2B is a schematic side view of the optical system in the second specific embodiment. To avoid any repetition, only the differences between the second specific embodiment and the first specific embodiment are described in the following. In this case, in its upper region, the base holder 20 comprises a bar 80, of which the dimensions, in a front view, are smaller than the cross-sectional area of the cut-out 60 by a predefined value. This makes it possible to first guide the cut-out 60 in the cylinder lens 36 over the bar 80 perpendicularly to the joining direction 40 and to then set down the cylinder lens 36 onto respective adhesives 50 in the joining direction 40, such that the cylinder lens 36 is form-fittingly connected to the base holder 20 by the adhesives 50 both at its lower end and in the region of the cut-out 60.

Figure 3:
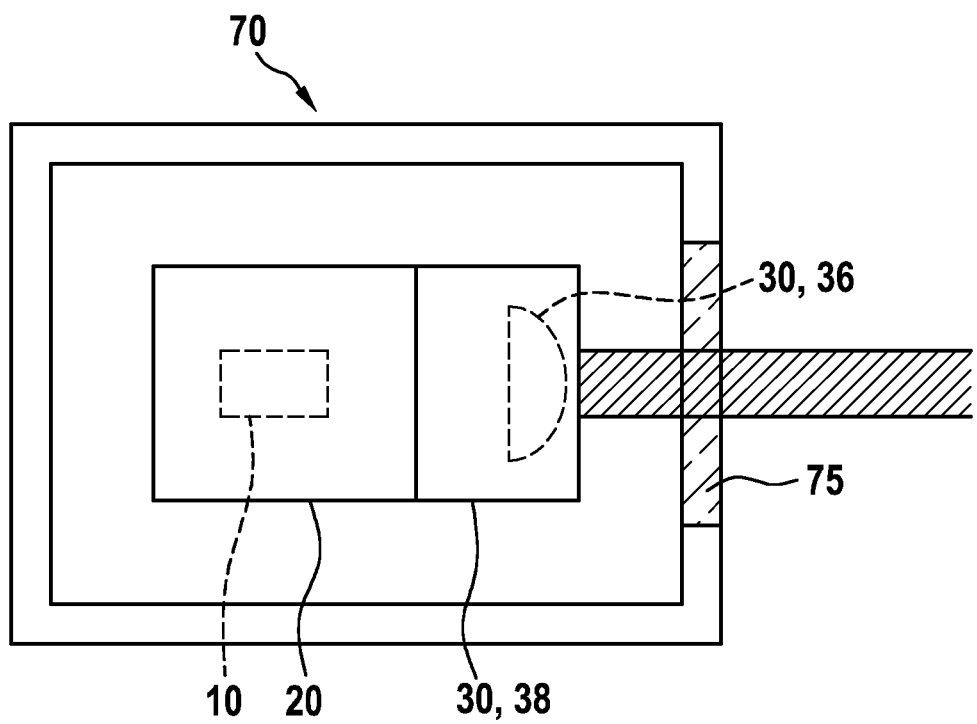
FIG. 3 is a schematic plan view of a LiDAR sensor according to an example embodiment of the present invention.

FIG. 3 is a schematic plan view of a LiDAR sensor 70 according to the present invention. The LiDAR sensor 70 comprises an above-described optical system according to the present invention, which is composed of the base holder 20, a light source 10, which is arranged inside the base holder 20 in this case, and an optical unit 30, wherein the optical unit 30 comprises a cylinder lens 36 and an optics holder 38. Laser light collimated by the cylinder lens 36 is emitted into surroundings of the LiDAR sensor 70 through a glass guard 75 of the LiDAR sensor 70.

What is claimed is:

1. An optical system, comprising:
    a light source;
    a base holder including a first fastening region and a second fastening region; and
    an optical unit including a third fastening region and a fourth fastening region;
    wherein:
    the optical unit is fastened to the base holder in a joining direction oriented perpendicularly to the first, second, and third fastening regions, such that the first fastening region is glued to the third fastening region and the second fastening region is glued to the fourth fastening region,
    the light source is fastened in a predefined position and with a predefined orientation relative to the base holder,
    the third fastening region and the fourth fastening region are provided on the optical unit so as to be spaced apart from one another in the joining direction between the optical unit and the base holder, the fourth fastening region is provided in a cut-out in the optical unit, and
    the optical unit is configured to influence a light beam emitted by the light source toward the optical unit.

2. The optical system as recited in claim 1, wherein the optical unit includes at least one fastening bracket, which covers the base holder in the joining direction and includes the third fastening region or the fourth fastening region.

3. The optical system as recited in claim 1, wherein respective materials for producing the base holder and the optical unit have substantially uniform coefficients of thermal expansion.

4. The optical system as recited in claim 1, wherein the optical unit brings about collimation in a predefined spatial direction, wherein the joining direction and an arrangement of the first, second, third, and fourth fastening regions are determined such as to minimize an influence that movement of the optical unit relative to the light source in the joining direction has on the collimation.

5. A LIDAR sensor, comprising:
    a transmitting unit having an optical system, the optical system including
    a light source,
    a base holder including a first fastening region and a second fastening region, and
    an optical unit including a third fastening region and a fourth fastening region,
    wherein:
    the optical unit is fastened to the base holder in a joining direction oriented perpendicularly to the first, second, and third fastening regions, such that the first fastening region is glued to the third fastening region and the second fastening region is glued to the fourth fastening region,
    the light source is fastened in a predefined position and with a predefined orientation relative to the base holder,
    the third fastening region and the fourth fastening region are provided on the optical unit so as to be spaced apart from one another in the joining direction between the optical unit and the base holder, the fourth fastening region is provided in a cut-out in the optical unit, and
    the optical unit is configured to influence a light beam emitted by the light source toward the optical unit.

6. A method for producing an optical system, comprising the following steps:
    providing a light source and a base holder, wherein the light source is fastened in a predefined position and with a predefined orientation relative to the base holder;
    applying an adhesive to:
    at least one of a first fastening region of the base holder and/or a third fastening region of an optical unit of the optical system, and
    at least one of a second fastening region of the base holder and/or a fourth fastening region of the optical unit,
    wherein the third fastening region and the fourth fastening region are provided on the optical unit so as to be spaced apart from one another in a joining direction between the optical unit and the base holder, the fourth fastening region is provided in a cut-out in the optical unit; and
    fastening the optical unit to the base holder in the joining direction, which is oriented perpendicularly to the first, second, third, and fourth fastening regions, such that the first fastening region is glued to the third fastening region and the second fastening region is glued to the fourth fastening region, wherein the optical unit is configured to influence a light beam emitted by the light source toward the optical unit.

7. The method as recited in claim 6, wherein the step of fastening the optical unit to the base holder comprises:
    roughly positioning and roughly orienting the optical unit relative to the light source, wherein, during the roughly positioning and roughly orienting step, the first and second fastening regions of the base holder are not yet in contact with the third and fourth fastening regions of the optical unit via the adhesive;
    bringing together the optical unit and the base holder in the joining direction such that the first and second fastening regions of the base holder come into contact with the third and fourth fastening regions of the optical unit via the adhesive;
    finely positioning and finely orienting the optical unit relative to the light source using an optical measurement; and
    curing the adhesive.

* * * * *